(12) United States Patent
Rudnicki

(10) Patent No.: US 9,815,413 B2
(45) Date of Patent: Nov. 14, 2017

(54) VEHICLE CARGO CARRIER DEVICE

(71) Applicant: Michael Rudnicki, Thunder Bay (CA)

(72) Inventor: Michael Rudnicki, Thunder Bay (CA)

( * ) Notice: Subject to any disclaimer, the term of this patent is extended or adjusted under 35 U.S.C. 154(b) by 34 days.

(21) Appl. No.: 15/017,003

(22) Filed: Feb. 5, 2016

(65) Prior Publication Data
US 2017/0120833 A1    May 4, 2017

Related U.S. Application Data

(60) Provisional application No. 62/248,627, filed on Oct. 30, 2015.

(51) Int. Cl.
| | |
|---|---|
| *B60P 1/04* | (2006.01) |
| *B60P 1/28* | (2006.01) |
| *B60P 3/40* | (2006.01) |
| *B60R 9/042* | (2006.01) |
| *B60P 3/10* | (2006.01) |

(52) U.S. Cl.
CPC ............ *B60R 9/042* (2013.01); *B60P 3/1016* (2013.01)

(58) Field of Classification Search
CPC ............ B60P 3/1025; B60P 3/40; B60R 9/00
USPC ............... 212/74; 224/310, 315, 324; 296/3; 414/462, 477, 480, 538, 546
See application file for complete search history.

(56) References Cited

U.S. PATENT DOCUMENTS

| | | | | |
|---|---|---|---|---|
| 3,927,779 A | * | 12/1975 | Johnson | B60P 3/1025 414/462 |
| 3,972,433 A | * | 8/1976 | Reed | B60P 3/1025 224/310 |
| 4,020,961 A | * | 5/1977 | Musgrove | B60P 3/1025 414/462 |
| 4,068,772 A | * | 1/1978 | Prudhomme | B60P 3/08 410/26 |
| 4,274,788 A | * | 6/1981 | Sutton | B60P 3/1025 224/310 |
| 4,659,131 A | * | 4/1987 | Flournoy, Jr. | B60P 3/42 296/3 |
| 5,303,858 A | * | 4/1994 | Price | B60P 3/073 224/282 |
| 5,586,856 A | * | 12/1996 | Springer | B60P 3/10 414/462 |
| 5,609,462 A | | 3/1997 | Reimer | |
| 5,743,583 A | * | 4/1998 | Lowe | B60P 3/00 211/195 |

(Continued)

*Primary Examiner* — Gregory Adams
(74) *Attorney, Agent, or Firm* — Ryan W. Dupuis; Ade & Company Inc.

(57) ABSTRACT

A cargo carrier device supports cargo thereon for movement relative to a truck box between a loading position substantially at ground level rearward of the truck box and a transport position above the vehicle. The device includes a cargo frame defining a planar rack for supporting cargo thereon above a passenger cab of the truck in the transport position. A cargo supporting crossbar can be selectively positioned above the planar rack which is adapted to suspend cargo therefrom. A four bar linkage which pivots through an intermediate over-center position between the loading and transport positions is adapted to support the crossbar i) centrally above the truck box in the transport position and ii) rearward of the truck box and lower in elevation in the loading position for use in hoisting suspended cargo into the truck box.

18 Claims, 9 Drawing Sheets

(56) References Cited

U.S. PATENT DOCUMENTS

| | | | | |
|---|---|---|---|---|
| 5,743,702 | A * | 4/1998 | Gunderson | B60P 1/5442 |
| | | | | 224/403 |
| 6,435,806 | B1 * | 8/2002 | Rinderknecht | B60P 1/483 |
| | | | | 212/255 |
| 6,644,704 | B1 * | 11/2003 | Nyberg | B60R 9/00 |
| | | | | 224/405 |
| 6,676,220 | B2 * | 1/2004 | Mistler | B60P 1/28 |
| | | | | 298/1 A |
| 7,011,486 | B2 * | 3/2006 | Dyer | B60P 1/54 |
| | | | | 212/180 |
| 7,992,732 | B2 | 8/2011 | Demiany et al. | |
| 8,491,059 | B2 * | 7/2013 | Smith | B60P 3/40 |
| | | | | 298/1 A |
| 8,534,981 | B1 * | 9/2013 | Bortz | B60P 1/4442 |
| | | | | 414/462 |
| 2012/0263561 | A1 | 10/2012 | Li | |
| 2015/0132090 | A1 * | 5/2015 | Giamatti | B60R 9/042 |
| | | | | 414/462 |

* cited by examiner

VEHICLE CARGO CARRIER DEVICE

This application claims the benefit under 35 U.S.C. 119(e) of U.S. provisional application Ser. No. 62/248,627, filed Oct. 30, 2015.

FIELD OF THE INVENTION

The present invention relates to a cargo carrier device for a vehicle which includes a cargo frame defining a rack for supporting cargo thereon and an operating linkage for displacing the rack relative to the vehicle between a transport position above a roof of the vehicle, and a loading position in which the rack extends at an upward and forward inclination from a rear end of the rack which is proximate ground level at a rear of the vehicle.

BACKGROUND

Various forms of cargo carrier devices are known for supporting additional cargo on a vehicle. A common type of carrier is a roof mounted rack which spans above the roof of the vehicle which is particularly suited for supporting longer objects including ladders, boats, or any other desired cargo items to be transported which cannot be easily carried on other parts of the vehicle.

Due to the resultant height of a typical roof rack, various attempts have been made to lower the rack to more easily load cargo items thereon. U.S. Pat. No. 5,609,462 by Reimer discloses one example of a cargo carrier for a vehicle which is limited to use with boats and which does not significantly lower the carrier to allow access to most of the carrier from ground level. US application publication no. 2012/0263561 by Li discloses another example of a roof carrier which can be lowered to a loading position, but the device is limited to use with box trucks having a large roof area to support rollers at the rear of the truck to support the carrier as it is displaced between loading and transport positions.

U.S. Pat. No. 7,992,732 by Demiany discloses another example of a cargo supporting device for a vehicle, but the complex arrangements of parts is primarily directed towards loading a cargo box area of a truck, not providing convenient loading access to a roof rack.

SUMMARY OF THE INVENTION

It is an object of the present invention to provide a cargo carrier device which enables a variety of cargo items to be transported in the manner of a vehicular roof rack, but which allows for easier access for loading cargo onto the carrier device than conventional racks fixedly supported above the roof of a vehicle.

According to one aspect of the present invention there is provided a cargo carrier device for supporting cargo relative to a truck having a cargo box area with laterally opposed sides extending between a passenger cab at a front of the cargo box area and a rear of the cargo box area, the cargo carrier device comprising:

two mounting assemblies for mounting onto the two laterally opposed sides of the cargo box area respectively;

a cargo frame for supporting the cargo thereon; and an operating linkage assembly including a front link assembly and a rear link assembly operatively connected between the cargo frame and the mounting assemblies so as to define a four bar linkage in which:

the front link assembly includes two front link members pivotally coupled between the cargo frame and the mounting assemblies at the laterally opposing sides of the cargo box area respectively; and the rear link assembly includes two rear link members pivotally coupled between the cargo frame and the mounting assemblies at the laterally opposing sides of the cargo box area respectively;

the four bar linkage being adapted to support the cargo frame to be movable relative to the cargo box area between a transport position above the cargo box area and a loading position in which at least a portion of the cargo frame is more rearward and closer to a ground surface supporting the truck thereon than in the transport position.

Preferable the cargo frame defines a cargo supporting platform which is substantially horizontally oriented above a roof of the passenger cab of the truck in the transport position. Preferably the cargo supporting platform is supported at an upward and forward inclination in which at least a rear portion of the platform is rearward of the truck in the loading position.

The rear end of the rack is preferably adapted to be supported adjacent to the ground surface in the loading position.

The front link assembly is preferably pivoted through an over-center position between the loading position and the transport position such that a pivotal connection of the front link members to the cargo frame is displaced upwardly from the loading position to the over-center position and downwardly from the over-center position to the transport position.

Similarly, the rear link assembly is preferably pivoted through an over-center position between the loading position and the transport position such that a pivotal connection of the rear link members to the cargo frame is displaced upwardly from the loading position to the over-center position and downwardly from the over-center position to the transport position.

Preferably the mounting assemblies are adapted to i) support a pivotal connection of the rear link members to the mounting assemblies in proximity to the rear of the cargo box area, and ii) support a pivotal connection of the front link members to the mounting assemblies at a location which is spaced rearwardly of the front of the cargo box area and which is spaced forwardly of a pivotal connection of the rear link members to the mounting assemblies.

Preferably a length of the front link members between pivotal connections to the cargo frame and the mounting assemblies respectively is greater than a length of the rear link members between pivotal connections to the cargo frame and the mounting assemblies respectively.

The front link members may be stepped in profile such that in the transport position each front link member defines a first portion extending forwardly from a pivotal connection to the mounting assemblies, a second portion extending upwardly from the first portion proximate a rear of the passenger cab, and a third portion extending forwardly from the second portion over the passenger cab to a pivotal connection to the cargo frame.

The rear link members may also be stepped in profile such that in the loading position each rear link assembly defines a first portion extending rearwardly from a pivotal connection to the mounting assemblies and a second portion extending downwardly and rearwardly from the first portion to a pivotal connection to the cargo frame.

Preferably each front link member i) extends upwardly and forwardly between a pivotal connection to the mounting assemblies and a pivotal connection to the cargo frame in the transport position and ii) extends upwardly and rearwardly between the pivotal connection to the mounting assemblies and the pivotal connection to the cargo frame in the loading position.

Preferably each rear link assembly i) extends upwardly and forwardly between a pivotal connection to the mounting assemblies and a pivotal connection to the cargo frame in the transport position and ii) extends downwardly and rearwardly between the pivotal connection to the mounting assembly and the pivotal connection to the cargo frame in the loading position.

When the cargo frame comprises i) two side portions, each side portion pivotally coupling one of the front link members and one of the rear link members thereon, and ii) a cargo supporting crossbar spanning between the two side portions, preferably the cargo supporting crossbar is adapted to be supported in the transport position directly above the cargo box area and in the loading position spaced rearward of the cargo box area, lower in elevation than the transport position.

A winch may be supported on the cargo supporting crossbar.

When the two side portions define a cargo supporting platform which is substantially horizontally oriented in the transport position, preferably the cargo supporting crossbar is spaced above the two side portions in the transport position.

The cargo frame may further comprise two pivot arms pivotally coupled to the two side portions of the cargo frame respectively, the two pivot arms being joined to opposing ends of the cargo supporting crossbar such that the cargo supporting crossbar is supported for pivotal movement between a working orientation spaced above the two side portions in the transport position of the cargo frame and a stored orientation lying in a common plane with the two side portions of the cargo frame respectively.

The pivot arms may support the cargo supporting crossbar for pivotal movement about a common pivot axis relative to the cargo frame in two opposing directions from the working orientation to opposed first and second storage conditions respectively, in which the cargo supporting crossbar is in a common plane with the two side portions spaced forwardly of the common pivot axis in the first storage condition, and in which the cargo supporting crossbar is in said common plane with the two side portions spaced rearwardly of the common pivot axis in the second storage condition.

According to a second aspect of the present invention there is provided a cargo carrier device for supporting cargo relative to a truck having a cargo box area with laterally opposed sides extending between a passenger cab at a front of the cargo box area and a rear of the cargo box area, the cargo carrier device comprising:

two mounting assemblies for mounting onto the two laterally opposed sides of the cargo box area respectively;

a cargo frame comprising two side portions and a cargo supporting crossbar spanning between the two side portions for suspending the cargo therefrom; and an operating linkage assembly including a front link assembly and a rear link assembly operatively connected between the cargo frame and the mounting assemblies so as to define a four bar linkage in which:

the front link assembly includes two front link members pivotally coupled between the mounting assemblies and the two side portions of the cargo frame at the laterally opposing sides of the cargo box area respectively; and the rear link assembly includes two rear link members pivotally coupled between the mounting assemblies and the two side portions of the cargo frame at the laterally opposing sides of the cargo box area respectively;

the four bar linkage being adapted to support the cargo frame to be movable relative to the cargo box area between a transport position in which the cargo supporting crossbar is supported directly above the cargo box area and a loading position in which the cargo supporting crossbar is spaced rearward of the cargo box area, lower in elevation than the transport position.

According to another aspect of the invention there is provided a cargo carrier device for supporting cargo relative to a vehicle, the device comprising:

a rack for supporting the cargo thereon; and an operating linkage assembly arranged to be operatively connected between the rack and the vehicle to define a four bar linkage such that the rack is pivotally movable between a transport position above a roof of the vehicle and a loading position in which the rack is more upright in orientation and closer to the ground than in the transport position.

The rack is designed to lift and pivot the load upwardly and forwardly over the vehicle, specifically to clear objects such a toppers, quad runners, outboard motors and anything else that may be in the box. The unique design and geometry is set up so that the rack goes up, then back and finally down on the back side. It gets very close to the ground at the bottom while the top stays at an angle so that any potential load can be leaned against the rack, fastened on and then via power source, (hydraulic, linear actuators, or winches and cables, or chains) lifted up and onto the truck, in most cases ready to go.

Preferably the operating linkage assembly comprises a rear link assembly arranged to be pivotally coupled between the rack and a respective first portion of the vehicle in proximity to a rear end of the vehicle and a front link assembly arranged to be pivotally coupled between the rack at a location spaced forwardly of the rear link and a respective second portion of the vehicle spaced forwardly from the first portion of the vehicle.

Preferably the front link assembly and the rear link assembly each comprises a pair of link members supported at laterally opposing sides of the rack for pivotal movement relative to the rack about a common lateral pivot axis of the link assembly.

The device preferably also includes a linear actuator, for example an electric or hydraulic actuator, which is arranged to be operatively connected between the vehicle and the operating linkage assembly so as to be arranged to displace the operating linkage assembly between the transport position and the loading position as the linear actuator is extended and retracted.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
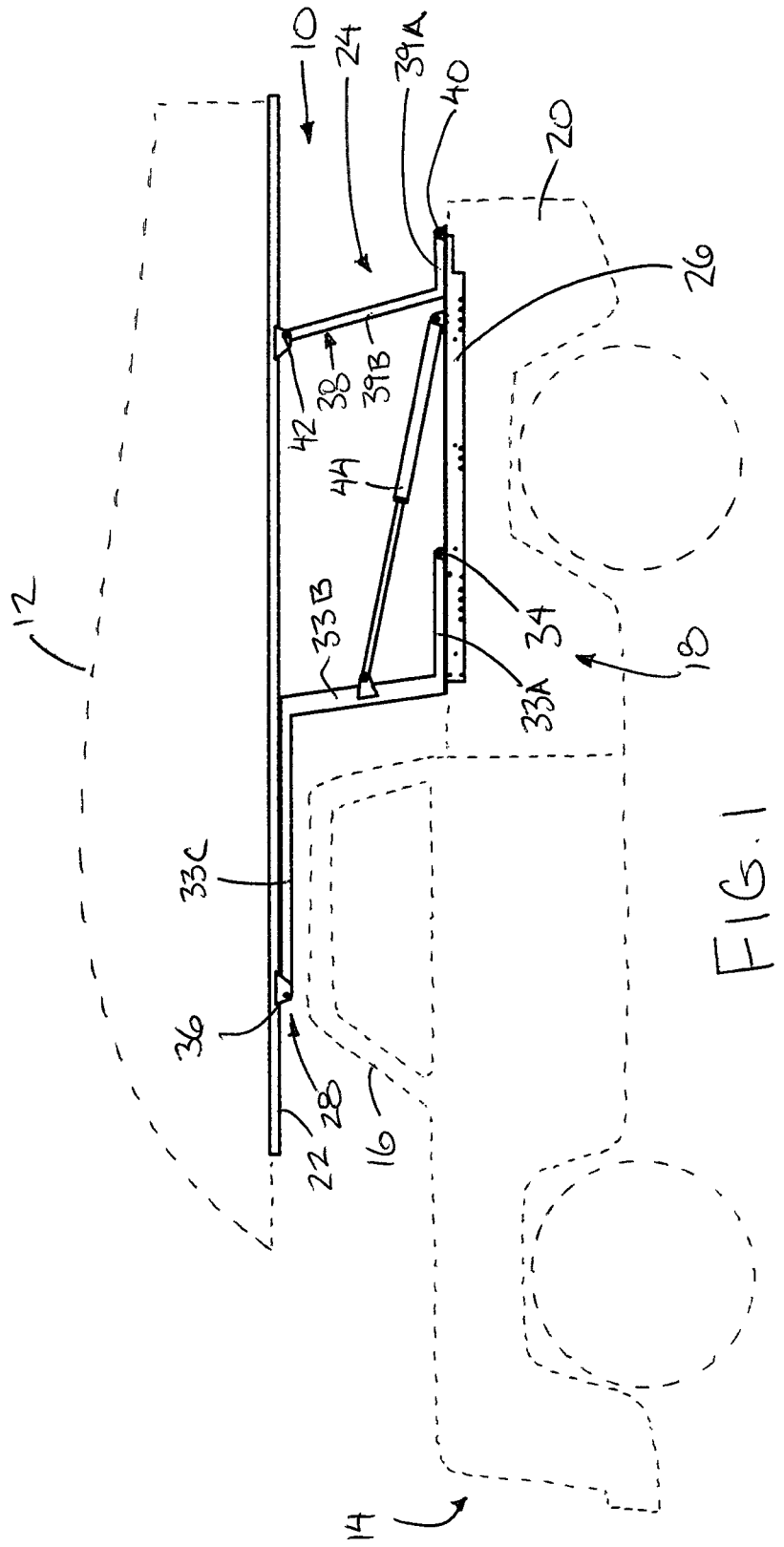
FIG. 1 is a side elevational view of the cargo carrier device according to a first embodiment supported on a vehicle in a transport position of the cargo frame.
Figure 2:
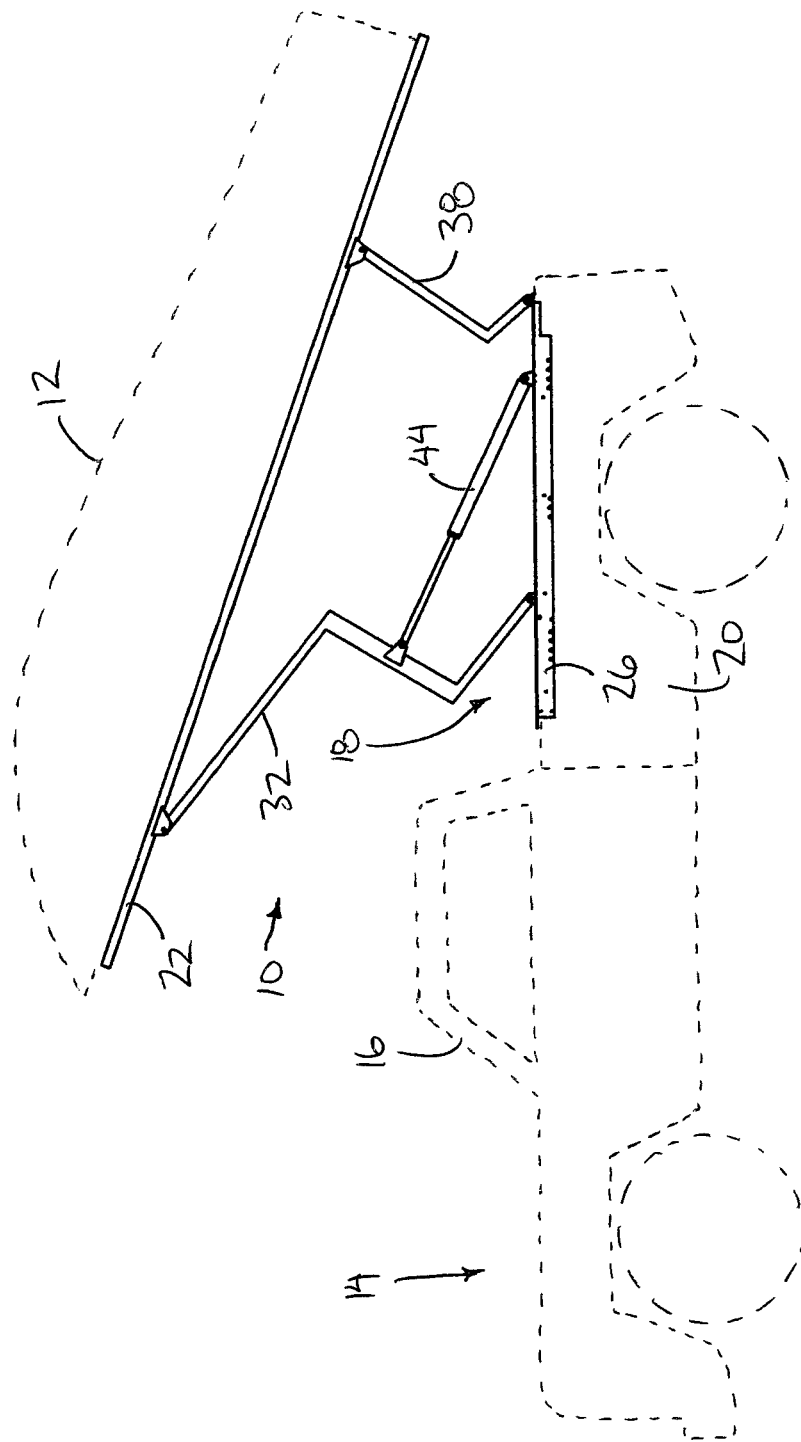
FIG. 2 is a side elevational view of the cargo carrier device according to the first embodiment supported on the vehicle in an intermediate position of the cargo frame between the transport position and a loading position.

Referring to the accompanying figures there is illustrated a cargo carrier device generally indicated by reference numeral 10. The device 10 is particularly suited for carrying various cargo items 12 relative to a vehicle 14.

In each of the illustrated embodiments, the vehicle comprises a pickup truck. More particularly the truck 14 includes an operator/passenger cab 16 for supporting passengers therein in proximity to the forward end of the vehicle and a cargo box area 18 at the rear of the vehicle. The cargo box area includes two side walls 20 extending in the longitudinal direction of the vehicle at laterally opposing sides of the cargo box area between the rear wall of the operator cab 16 at the front of the cargo box area and a gate at the rear end of the cargo box area.

Figure 3:
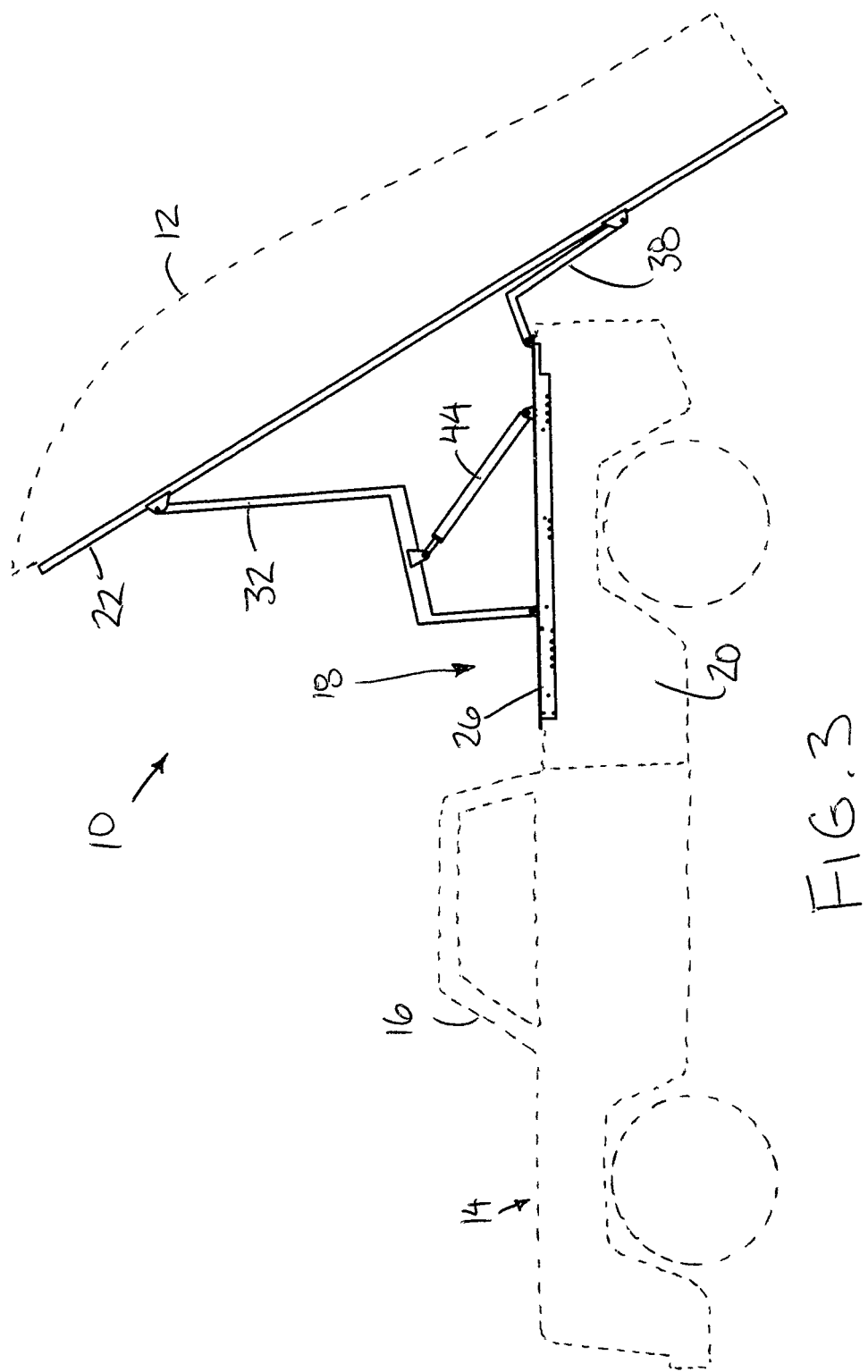
FIG. 3 is a side elevational view of the cargo carrier device according to the first embodiment supported on the vehicle in the loading position of the cargo frame.
Figure 4:
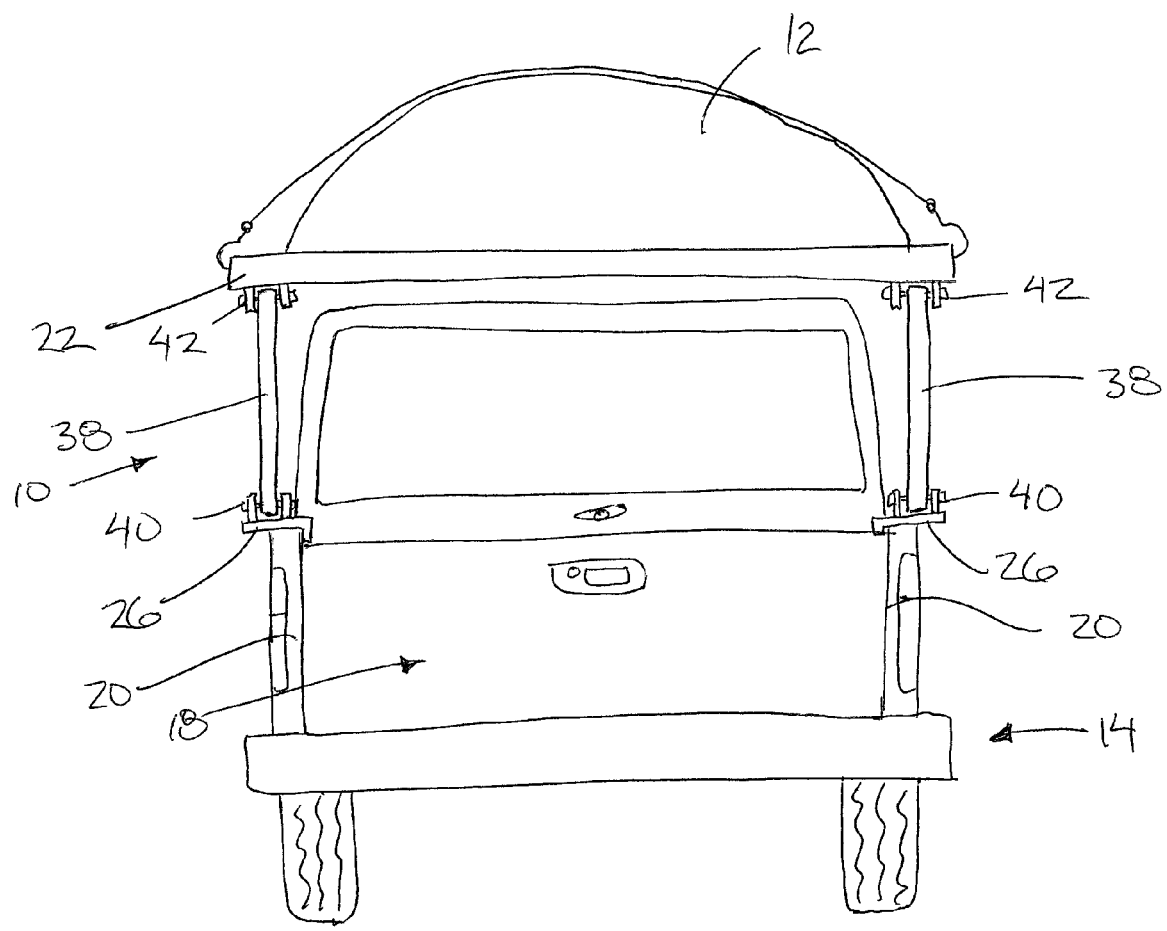
FIG. 4 is a rear elevational view of the cargo carrier device according to the first embodiment supported on the vehicle in the transport position.

The cargo box area may remain open at the top end thereof, or be enclosed by a tonneau cover, or alternatively the enclosed by a raised box cover is shown in broken line in FIGS. 1 and 3. A typical raised box cover includes side portions which rest on the side walls of the cargo box area to extend upwardly therefrom to a roof portion fully spanning over the cargo box area at a location spaced above the side walls.

According to the first illustrated embodiment of FIGS. 1 through 4, the cargo item comprises a boat. According to the second illustrated embodiment of FIGS. 5 through 11, the cargo item comprises a cargo object suspended from a cable.

Although various embodiments of the cargo carrier device are shown in the accompanying figures, the common features between the two embodiments will first be described.

The device 10 generally includes a cargo frame 22 defining a rack formed of frame members lying generally in a flat plane having an upper surface forming a load supporting platform suitable for supporting the cargo thereon. For example the frame members of the rack may include two side rails 21 spanning longitudinally along laterally opposing sides of the rack and which are connected to one another by laterally extending crossbars 23 at longitudinally spaced positions. The frame of the rack may remain open, or a load supporting panel may span the top side of the frame to assist in supporting smaller cargo items thereon. The rack may further include side walls, posts, brackets or other protruding elements which may be useful in securing cargo to the upper side of the planar frame primarily defining the rack 22.

The device 10 also includes an operating linkage assembly 24 for being coupled between the vehicle and the rack such that the rack is supported for movement between a transport position supported above the roof of the vehicle in a horizontal orientation as shown in FIG. 1 and a loading position in which the rack is more upright in orientation and closer to the ground towards a rear end of the vehicle so as to extend at an upward and forward inclination from a rear end of the rack substantially at ground level in the transport position as shown in FIG. 3.

The operating linkage assembly 24 includes two mounting assemblies in the form of side rails 26 which are arranged to be secured along the top side of the two side walls 20 of the cargo box area of the truck respectively. Each side rail may comprise a flange portion with suitable mounting apertures therein which is suited for being fastened between the top end of the side walls of the truck box and a box cover for enclosing the truck box which is supported thereabove.

The operating linkage assembly 24 further includes a front link assembly 28 pivotally coupled between the side rails 26 and the rack 22 towards a front end thereof and a rear link assembly 30 pivotally coupled between the side rails 26 and the rack 22 towards a rear end thereof.

The front link assembly 28 comprises two front link members 32 which are supported at respective laterally opposing sides of the cargo box area and the rack by being pivotally connected to the two side rails at respective lower pivot connections 34 defining a first common lateral axis and by being pivotally connected to opposing sides of the rack at respective upper pivot connections 36 defining a second common lateral axis.

The lower pivot connections 34 of the front link assembly are located at the top side of the side walls of the cargo box area closer to the front end of the cargo box than the rear end thereof while remaining space rearwardly from the front end of the box area. The upper pivot connections 36 are in proximity to the front end of the rack so as to be positioned forwardly of the operator cab of the vehicle in the transport position. More particularly, each front link member 32 extends upwardly and forwardly from the lower pivot connection to the upper pivot connection in the transport position.

As the rack is displaced to the loading position from the transport position, the upper pivot connections of the front link members are displaced upwardly and rearwardly to an over centre position followed by downward and rearward movement to the final loading position in which the front link members extend upwardly and rearwardly from the lower pivot connections to the upper pivot connections thereof.

Each front link member 32 is stepped in profile such that it includes a first portion 33A which extends horizontally forward from the lower pivot connection in the transport position, a second portion 33B which extends vertically upward from the forward end of the first portion alongside the rear of the operator cab in the transport position, and a third portion 33C which extends horizontally forward over top of the operator cab from the top end of the second portion to the upper pivot connection at the forward end thereof in the transport position.

The rear link assembly 30 comprises two rear link members 38 which are supported at respective laterally opposing sides of the cargo box area and the rack by being pivotally connected to the two side rails at respective lower pivot connections 40 defining another common lateral axis and by being pivotally connected to opposing sides of the rack at respective upper pivot connections 42 defining a further common lateral axis.

The lower pivot connections 40 of the rear links are situated at the top side of the side walls of the cargo box area in proximity to the rear ends of the side walls at the rear of the cargo box area. The upper pivot connections 42 are located on the rack to be closer to the rear end of the rack than the forward end thereof while remaining spaced forwardly from the rear end in the transport position. The upper pivot connections 42 are thus located upwardly and forwardly relative to the lower pivot connections of the rear link members in the transport position.

As the rack is displaced to the loading position from the transport position the upper pivot connections of the rear link members are initially displaced upwardly and rearwardly to an over centre position, followed by downward and rearward movement from the over centre position to the final loading position in which the rear link members are oriented to extend downwardly and rearwardly from the lower pivot connections to the upper pivot connections.

Each rear link member is also stepped in profile such that it defines a first portion 39A which extends horizontally forward from the lower pivot connection in the transport position but which extends horizontally rearward from the lower pivot connection in the loading position, and a second portion 39B which is inclined upwardly and forwardly from the front end of the first portion in the transport position but which extends downwardly and rearwardly from the first portion to the upper pivot connection parallel to the plane of the rack along the bottom side thereof in the loading position.

The front links of the front link assembly, the rear links of the rear link assembly, the side rails 26, and the frame of the rack 22, together with the upper and lower pivot connections therebetween effectively define a four bar linkage configuration which controls the movement of the rack relative to the vehicle between the loading and transport positions.

The device 10 further includes two linear actuators 44 supported at laterally opposing sides of the vehicle. Each linear actuator is pivotally coupled at a first end to a respective one of the side rails 26 towards the rear end thereof at a location forwardly of the lower pivot connection of the corresponding rear link member and is pivotally coupled at a second end to a respective one of the front link members at an intermediate location along the second portion 33B thereof. Extending the two linear actuators 44 in unison causes the operating linkage assembly to displace the rack to the transport position shown in FIG. 1. Alternatively, retracting the two linear actuators in unison causes the operating linkage to displace the rack to the loading position shown in FIG. 3. As shown in the accompanying Figures, the actuator is supported fully above the top side of the two side walls respectively throughout movement of the cargo frame between the transport position and the loading position.

Typically the linear actuators 44 each comprise a hydraulic piston cylinder arrangement or an electrically controlled actuator which allows precise operator controlled to extend and retract the length thereof.

In yet further embodiments the linear actuators 44 may be replaced with various types of actuating mechanisms including winches, cables, pulleys and/or gears for example.

In use, the device 10 is mounted on a vehicle by securing the two side rails 26 thereof along the top sides of the two side walls of a cargo box area of a pickup truck. The actuators are used to lower the rack into the loading position in which the upper supporting surface defining the plane of the rack lies at an upward and forward inclination with the rear end thereof substantially at ground level towards the rear of the vehicle. A cargo item can be leaned against the upper supporting surface of the rack and secured in place using straps and the like for example. In the example of a boat, an open frame of the rack allows protruding element including seats or a motor and the like to protrude through the plane of the rack. The actuators can then be operated to raise the rack by pivoting the link members so that the rack is displaced upwardly and forwardly through an over centre position towards the transport position shown in FIG. 1. The front and rear links pivoting over centre ensure clearance is provided for the rack to extend up and over a cargo box cover for example without interference therebetween. Once in the transport position, the rack can be secured by various means, including use of locking pins at one or more locations along the link members, use of securing straps, or locking of the actuators 44 for example. To unload the cargo item, the reverse operation is performed by unlocking the rack from the transport position, pivoting the rack to the loading position, and releasing the cargo item from the rack.

According to the first embodiment of FIGS. 1 through 4, the cargo frame is a planar frame suited primarily for use as a cargo rack.

Figure 9:
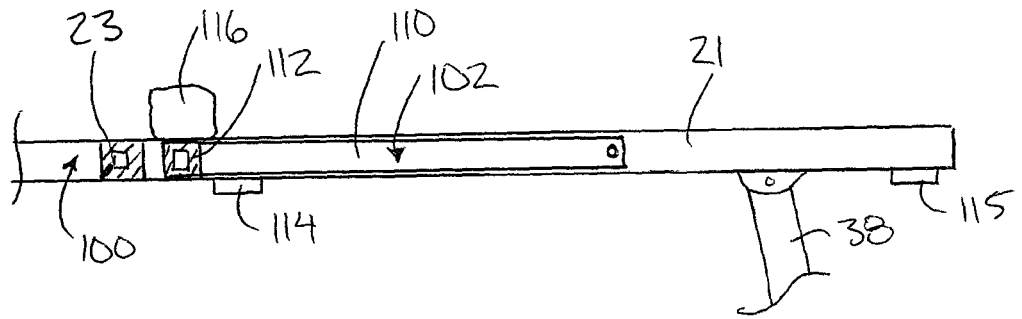
FIG. 9 is a vertical cross section view oriented in the longitudinal direction of the cargo supporting crossbar of the second embodiment in the first storage condition.
Figure 10:
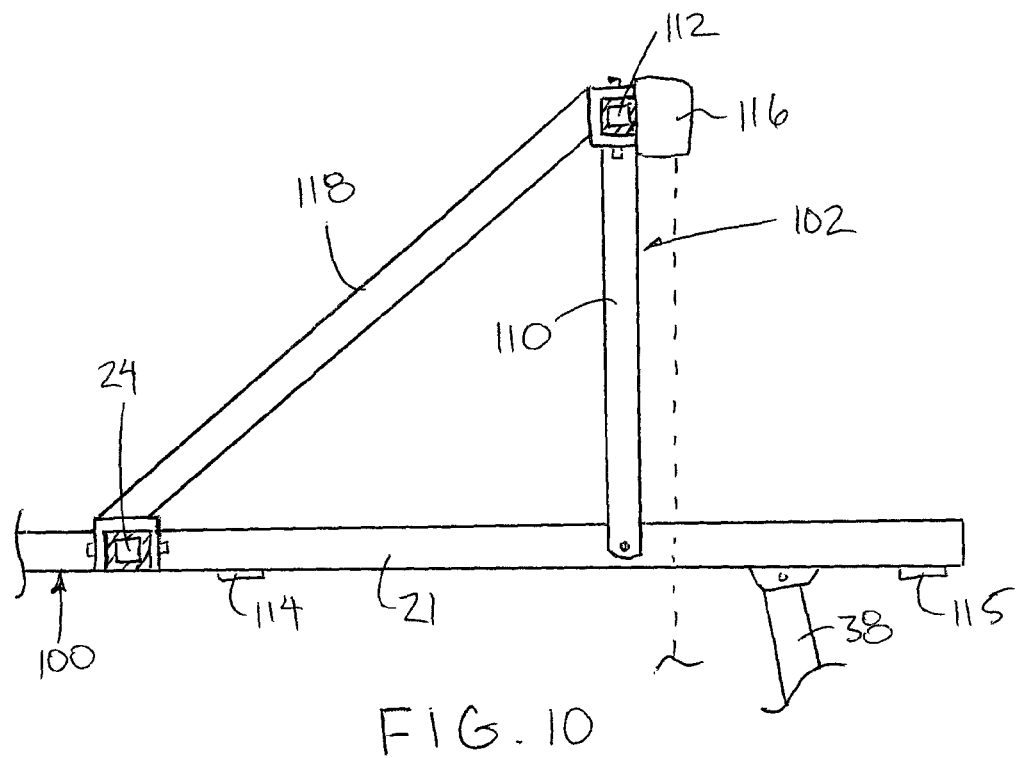
FIG. 10 is the vertical cross section view of FIG. 9 in the working condition of the cargo supporting crossbar.
Figure 11:
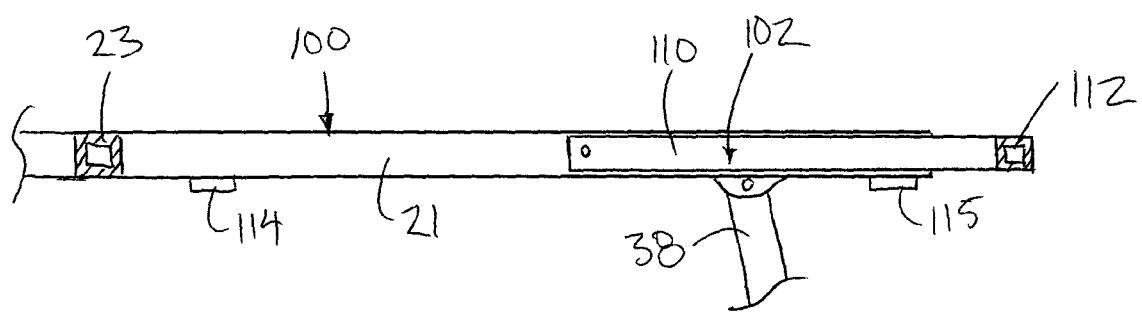
FIG. 11 is the vertical cross section view of FIG. 9 in the second storage condition of the cargo supporting crossbar.

According to the second embodiment of FIGS. 5 through 11, the cargo frame includes a main frame portion 100 and a pivoting frame portion 102 which is pivotal relative to the main frame portion 100 between a working condition shown in FIGS. 5, 6, 7, 8 and 10, a first storage condition shown in FIG. 9, and a second storage condition shown in FIG. 11.

The main frame portion 100 of the cargo frame includes the two side rails 21 extending longitudinally the full length of the main frame portion at laterally opposing sides relative to one another. The two side rails 21 define two laterally opposed side portions of the cargo frame upon which the front and rear link members are pivotally connected as described above. The two side rails are joined to one another at respective front ends by a forward crossbar 23, and are joined to one another at an intermediate, central location in the longitudinal direction by an intermediate crossbar 23. An area between the two side rails rearward of the intermediate crossbar 23 remains open and unobstructed such that each side rail 21 terminates at a free rear end. The crossbars 23 and the side rails 21 lie in a common plane defining the planar platform surface of the cargo frame upon which cargo can be supported.

A railing frame 104 is mounted to each of the two side rails 21 to protrude upwardly from the planar frame structure defined by the side rails 21 along substantially the full length of the main frame portion 100 in the transport position. Each railing frame 104 comprises a plurality of posts 106 protruding up from the respective side rail at longitudinally spaced apart positions and a top bar 108 connected across the top ends of the posts 106 to extend in the longitudinal direction above the respective side rail 21. The railing frames serve to assist in containing cargo supported on the platform structure defined by the crossbars 23.

The pivoting frame portion 102 generally includes two pivot arms 110 which are pivotally supported at respective first ends of the pivot arms on the two side rails 21 respectively at an intermediate location which is approximately longitudinally centred between the intermediate crossbar 23 and the free rear ends of the side rails 21. The pivot location of the pivot arms is thus positioned to be spaced rearwardly from the intermediate crossbar 23 yet spaced forwardly of the rear ends of the side rails defining the rear end of the main frame portion 100.

The two pivot arms 110 of the pivoting frame structure are joined to one another at the opposing second ends by a cargo supporting crossbar 112 connected in fixed relation to the two pivot arms such that the two pivot arms and the cargo supporting crossbar 112 define a generally U shaped frame structure pivoted together relative to the main frame portion 100. The cargo supporting crossbar 112 thus spans laterally a full width of the cargo frame between the two laterally opposed side portions of the cargo frame.

The length of the pivot arms between the first and second ends thereof is near to or slightly less than a longitudinal distance between the pivotal connection of the pivot arms to the side rails and the mounting location of the intermediate crossbar 23 to the side rails. In this manner the pivoting frame structure can be pivoted forwardly into a first stored position in which the pivot arms extend forwardly from the first ends to the second ends thereof and the cargo supporting crossbar is adjacent to the intermediate crossbar 23 with the pivoting frame portion 102 lying substantially in a common plane with the side rails 21.

Two stop members 114 protrude inwardly from the bottom sides of the two side rails 21 at a location in proximity to but spaced rearwardly from the intermediate crossbar such that the pivoting frame portion 102 can be engaged upon the stop members in the first stored position to prevent further downward pivoting of the pivot frame portion 102 beyond the first stored position.

The pivoting frame portion 102 can be pivoted upwardly and rearwardly from the first stored position to a working position in which the pivot arms extend generally perpendicularly upwardly from the two side rails respectively such that the cargo supporting crossbar is spaced above the platform of the main frame portion 100 by a distance which is greater than the height of the operating linkage 24 in the transport position. The cargo supporting crossbar 112 is located relative to the main frame portion such that the crossbar is located at an intermediate location spaced from both front and rear ends of the cargo box area, directly above the cargo box area in the transport position. As described above and illustrated in the figures, the cargo supporting platform defined by the two side rails 21 is thus open, unobstructed and devoid of any structure between the two side rails along a portion of the rails which protrude rearward of the pivoting frame portion 102 including the crossbar in the transport position.

A winch 116 is mounted at a laterally centred location on the cargo supporting crossbar having a drum with a cable wound thereon from which the cargo item can be suspended as the cargo frame is displaced between transport and loading positions.

To assist in retaining the pivoting frame structure in the working position, an additional brace arm 118 can be selectively secured using releasable pin connections to the intermediate crossbar 23 and the cargo supporting crossbar 112 respectively. More particularly, the brace arm 118 is adapted for a removable pinned connection at a forward end of the brace arm to a laterally centred location on the intermediate crossbar 23. The brace arm extends upwardly and rearwardly from the intermediate crossbar to a removable pinned connection at a rearward end of the brace arm at a laterally centred location on the cargo supporting crossbar 112. Removing the pin connections allows the brace arm to be separated from the cargo frame to permit free pivoting of the pivoting frame portion 102 relative to the main frame portion 100.

The crossbar 112 of the pivoting frame structure is pivoted upwardly and rearwardly from the first stored position to the working position, and can continue to pivot beyond the working position downwardly and rearwardly to a second stored position shown in FIG. 11. In the second stored position the pivot arms extend rearwardly from the first ends to the second ends thereof in a common plane with the side rails such that the cargo supporting crossbar 112 is spaced rearwardly relative to the rear ends of the side rails 21 while remaining in a common plane with the side rails.

Additional stop members 115 protrude inwardly from the opposing side rails in proximity to the rear ends of the side rails upon which the pivot arms of the pivoting frame structure are engaged in the second stored position to prevent further downward pivoting of the pivoting frame portion 102 beyond the second stored position.

Locking pins can be received through cooperating apertures in the pivot arms and the side rails 21 to selectively retain the pivoting frame portion 102 in fixed relation to the main frame portion 100 in each of the first and second stored positions.

Locating the pivoting frame portion in the first stored position is particularly suited for maintaining an open unobstructed access to the cargo box area of the truck.

Alternatively, locating the pivot frame portion 102 in the second stored position is particularly suited for use of the cargo supporting crossbar 112 as an additional platform defining structure of the rack when using the cargo frame to support elongated cargo items on the planar platform structure of the cargo frame.

Figure 5:
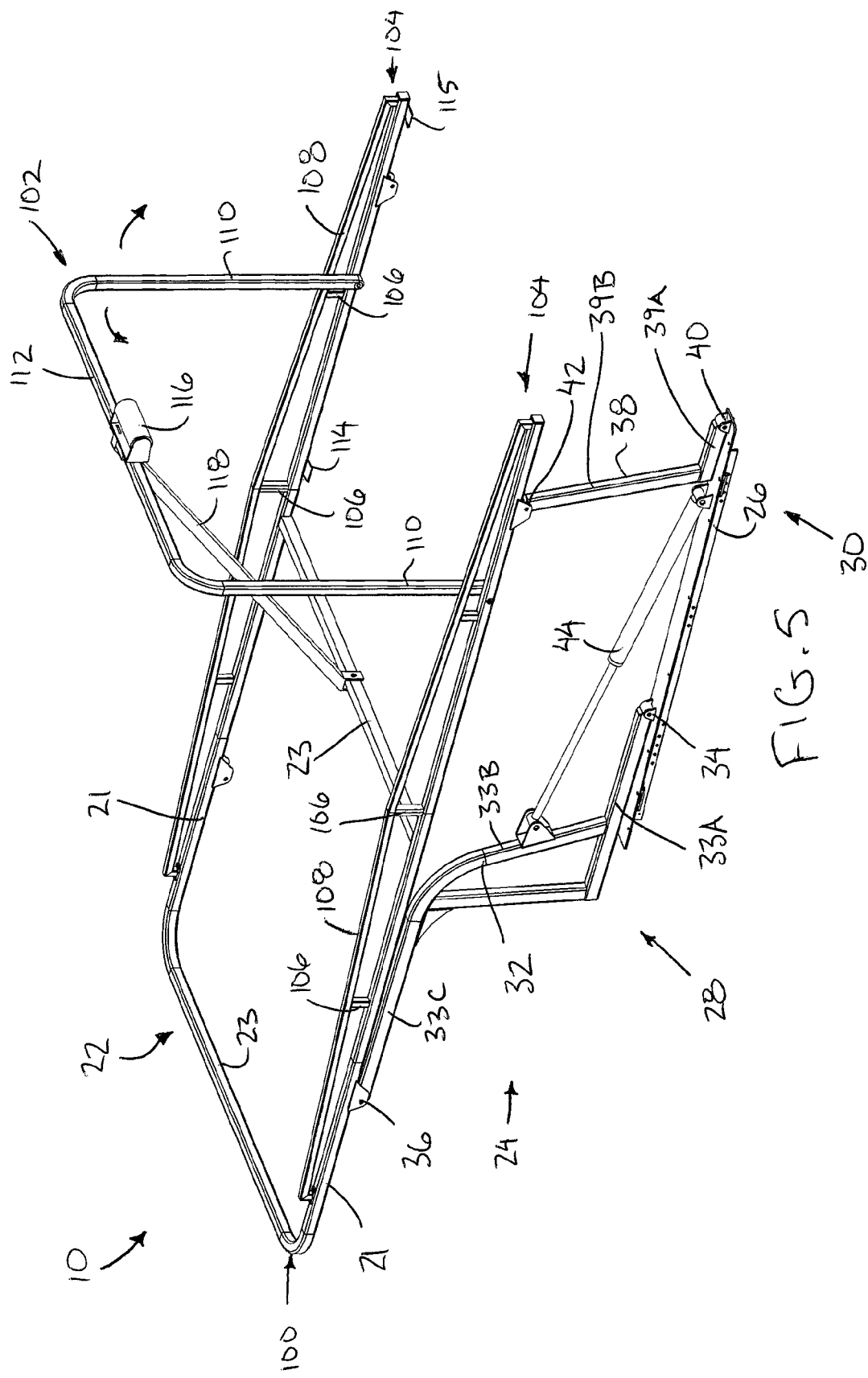
FIG. 5 is a perspective view of a second embodiment of the cargo carrier device.
Figure 6:
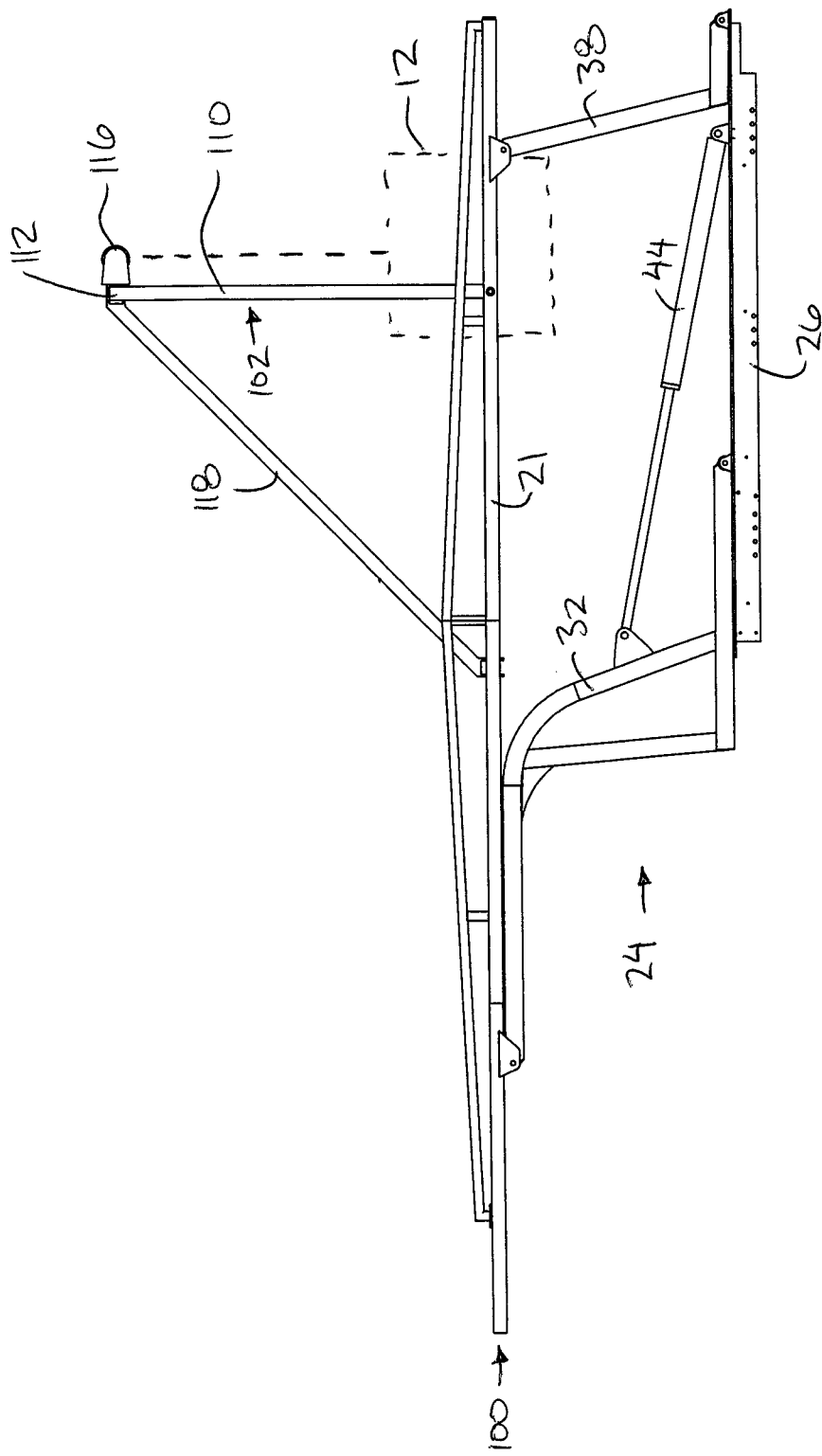
FIG. 6 is a side elevational view of the cargo carrier device according to the second embodiment in the transport position.
Figure 7:
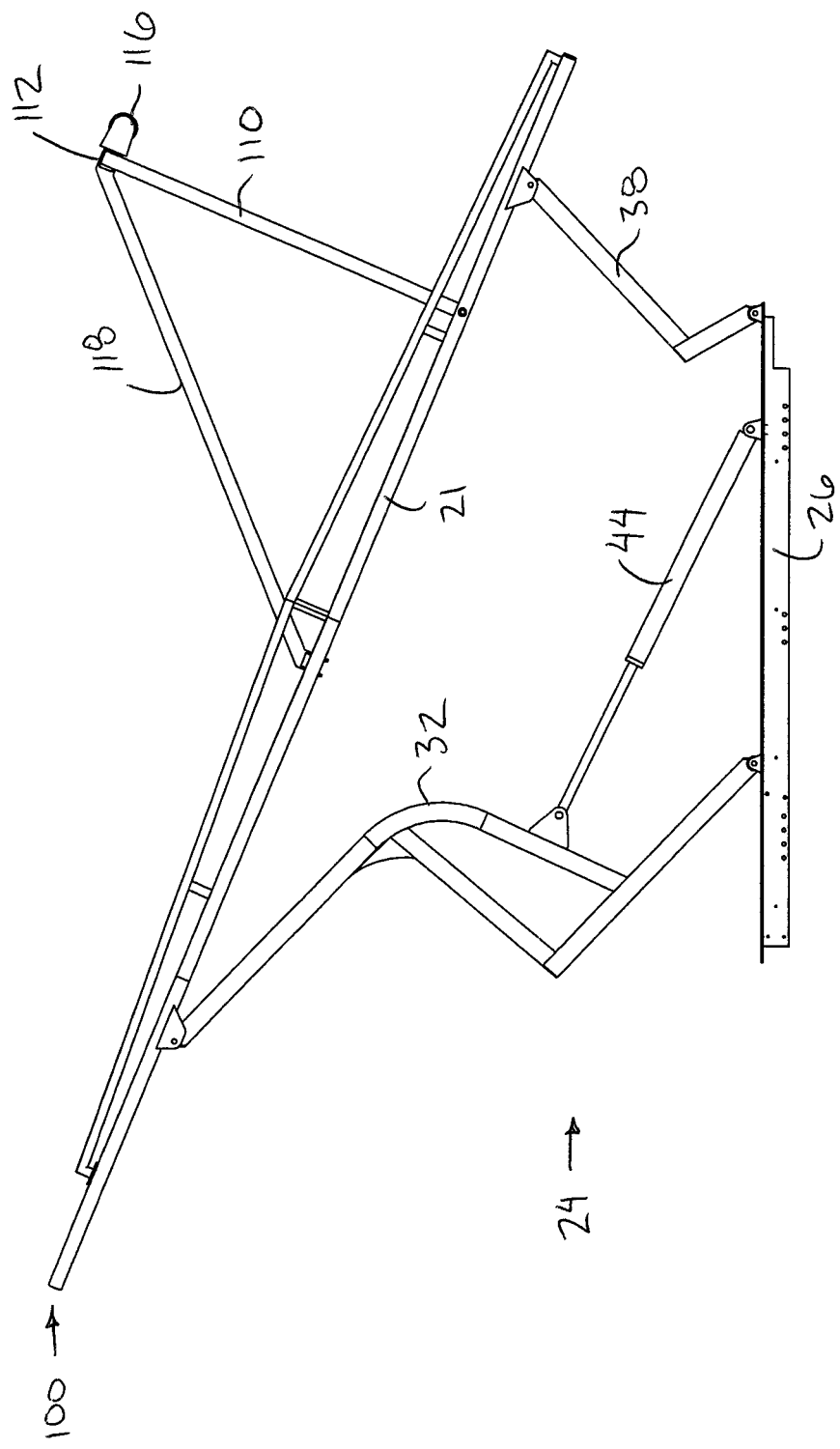
FIG. 7 is a side elevational view of the cargo carrier device according to the second embodiment in the intermediate position.
Figure 8:
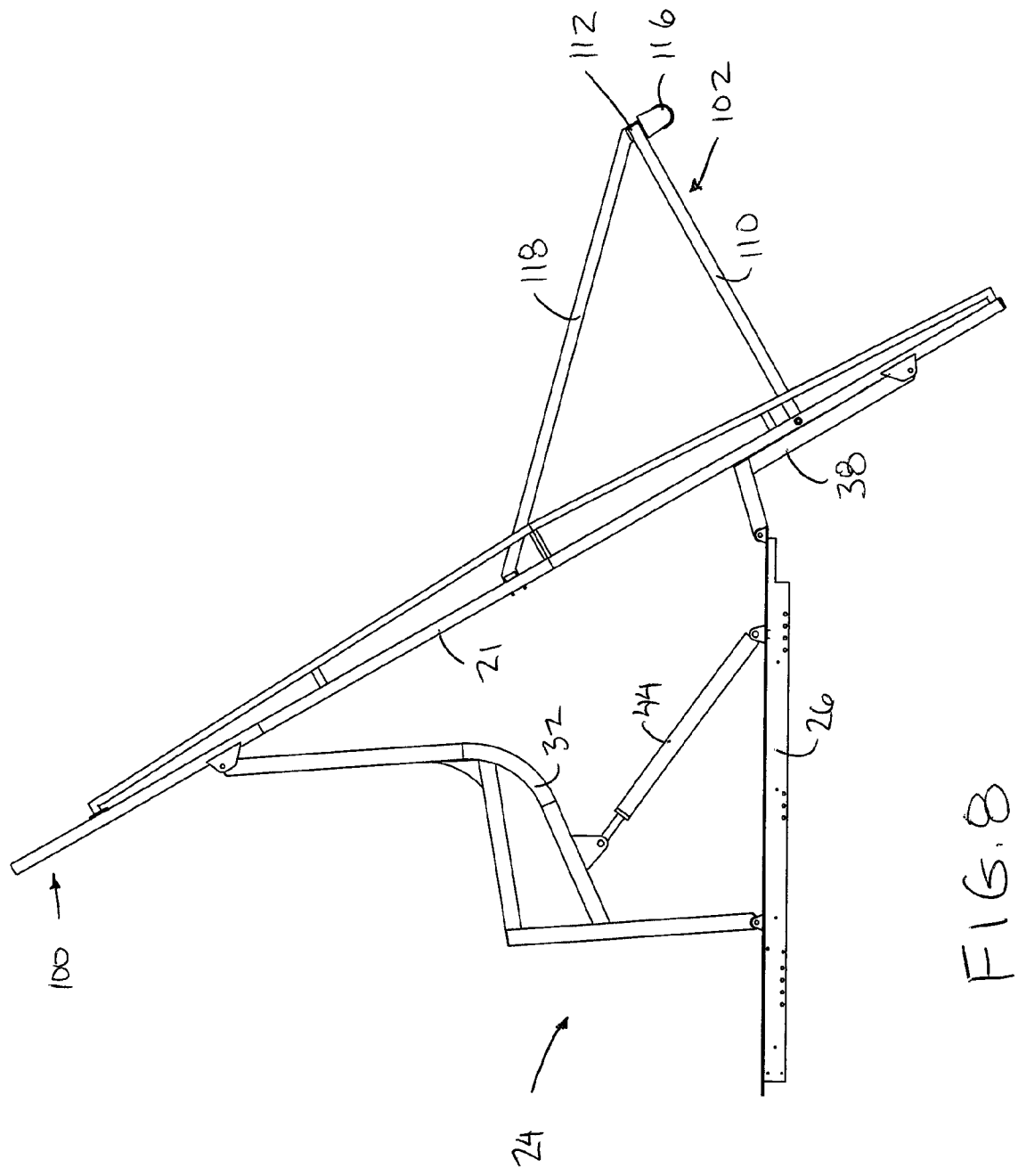
FIG. 8 is a side elevational view of the cargo carrier device according to the second embodiment in the loading position.

Supporting the pivoting frame portion 102 in the working position of FIG. 5 is particularly suited for suspending cargo items from the cargo supporting crossbar 112 using a cable. In the working position of the pivoting frame portion 102, the cargo supporting crossbar 112 is typically positioned at a location spaced rearwardly from the truck at a lower elevation closer to a ground surface supporting the truck thereon than in the transport position. Accordingly the cargo item on the ground rearward of the truck box can be initially suspended from the cargo supporting crossbar. Subsequent displacement of the cargo frame from the loading position to the transport position may then sufficient to lift the cargo item suspended from the crossbar 112 upwardly and forwardly into an intermediate over-centre position, followed by continued displacement forwardly and downwardly into the cargo box area as the cargo frame reaches the transport position. The winch may also be used to lift the cargo item relative to the cargo supporting crossbar by winding the cable suspending the cargo item onto the winch.

Since various modifications can be made in my invention as herein above described, it is intended that all matter contained in the accompanying specification shall be interpreted as illustrative only and not in a limiting sense.

The invention claimed is:

1. A cargo carrier device in combination with a truck for supporting cargo relative to the truck, the truck having a cargo box area with laterally opposed side walls extending between a passenger cab at a front of the cargo box area and a rear of the cargo box area, the cargo carrier device comprising:

two mounting assemblies mounted solely onto a top side of the two laterally opposed side walls of the cargo box area respectively;

a cargo frame for supporting the cargo thereon;

an operating linkage assembly including a front link assembly and a rear link assembly operatively connected between the cargo frame and the mounting assemblies so as to define a four bar linkage in which:
  the front link assembly includes two front link members pivotally coupled between the cargo frame and the mounting assemblies at the laterally opposing sides of the cargo box area respectively; and
  the rear link assembly includes two rear link members pivotally coupled between the cargo frame and the mounting assemblies at the laterally opposing sides of the cargo box area respectively;
  the four bar linkage being adapted to support the cargo frame to be movable relative to the cargo box area between a transport position above the cargo box area and a loading position in which at least a portion of the cargo frame is more rearward and closer to a ground surface supporting the truck thereon than in the transport position; and
an actuator operatively connected between the truck and the operating linkage, the actuator being supported fully above the top side of the two side walls respectively throughout movement of the cargo frame between the transport position and the loading position;
wherein the front link assembly is pivoted through an over-center position between the loading position and the transport position such that a pivotal connection of the front link members to the cargo frame is displaced upwardly from the loading position to the over-center position and downwardly from the over-center position to the transport position.

2. The device according to claim 1 wherein the cargo frame defines a cargo supporting platform which is substantially horizontally oriented above a roof of the passenger cab of the truck in the transport position and wherein the cargo supporting platform is supported at an upward and forward inclination in which at least a rear portion of the platform is rearward of the truck in the loading position.

3. The device according to claim 1 wherein a rear end of the cargo frame is adapted to be supported adjacent to the ground surface in the loading position.

4. The device according to claim 1 wherein the rear link assembly is pivoted through an over-center position between the loading position and the transport position such that a pivotal connection of the rear link members to the cargo frame is displaced upwardly from the loading position to the over-center position and downwardly from the over-center position to the transport position.

5. The device according to claim 1 wherein the mounting assemblies are adapted to support a pivotal connection of the rear link members to the mounting assemblies in proximity to the rear of the cargo box area.

6. The device according to claim 1 wherein the mounting assemblies are adapted to support a pivotal connection of the front link members to the mounting assemblies at a location which is spaced rearwardly of the front of the cargo box area and which is spaced forwardly of a pivotal connection of the rear link members to the mounting assemblies.

7. The device according to claim 1 wherein a length of the front link members between pivotal connections to the cargo frame and the mounting assemblies respectively is greater than a length of the rear link members between pivotal connections to the cargo frame and the mounting assemblies respectively.

8. The device according to claim 1 wherein the front link members are stepped in profile such that in the transport position each front link member defines a first portion extending forwardly from a pivotal connection to the mounting assemblies, a second portion extending upwardly from the first portion proximate a rear of the passenger cab, and a third portion extending forwardly from the second portion over the passenger cab to a pivotal connection to the cargo frame.

9. The device according to claim 1 wherein the rear link members are stepped in profile such that in the loading position each rear link assembly defines a first portion extending rearwardly from a pivotal connection to the mounting assemblies and a second portion extending downwardly and rearwardly from the first portion to a pivotal connection to the cargo frame.

10. The device according to claim 1 wherein each front link member extends upwardly and forwardly between a pivotal connection to the mounting assemblies and a pivotal connection to the cargo frame in the transport position and wherein each front link member extends upwardly and rearwardly between the pivotal connection to the mounting assemblies and the pivotal connection to the cargo frame in the loading position.

11. The device according to claim 1 wherein each rear link assembly extends upwardly and forwardly between a pivotal connection to the mounting assemblies and a pivotal connection to the cargo frame in the transport position and wherein each rear link members extends downwardly and rearwardly between the pivotal connection to the mounting assembly and the pivotal connection to the cargo frame in the loading position.

12. The device according to claim 1 wherein the cargo frame comprises two side portions, each side portion pivotally coupling one of the front link members and one of the rear link members thereon, and a cargo supporting crossbar spanning between the two side portions so as to be adapted to be supported in the transport position directly above the cargo box area and in the loading position spaced rearward of the cargo box area, lower in elevation than the transport position.

13. A cargo carrier device in combination with a truck, for supporting cargo relative to the truck, the having a cargo box area with laterally opposed sides extending between a passenger cab at a front of the cargo box area and a rear of the cargo box area, the cargo carrier device comprising:
  two mounting assemblies for mounting onto the two laterally opposed sides of the cargo box area respectively;
  a cargo frame comprising (i) two side portions defining a cargo supporting platform, (ii) a cargo supporting crossbar spanning between the two side portions for suspending the cargo therefrom, and (iii) two pivot arms pivotally coupled to the two side portions of the cargo frame respectively, the two pivot arms being joined to opposing ends of the cargo supporting crossbar such that the cargo supporting crossbar is supported for pivotal movement between a working orientation spaced from a plane of the two side portions of the cargo frame and a stored orientation lying in a common plane with the two side portions of the cargo frame respectively; and
  an operating linkage assembly including a front link assembly and a rear link assembly operatively connected between the cargo frame and the mounting assemblies so as to define a four bar linkage in which:
    the front link assembly includes two front link members pivotally coupled between the mounting assemblies and the two side portions of the cargo frame at the laterally opposing sides of the cargo box area respectively; and the rear link assembly includes two rear link members pivotally coupled between the mounting assemblies and the two side portions of the cargo frame at the laterally opposing sides of the cargo box area respectively;

the four bar linkage being adapted to support the cargo frame including the cargo supporting platform and the cargo supporting crossbar to be movable together relative to the cargo box area between a transport position and a loading position;

in the transport position, the cargo supporting platform defined by the two side portions is substantially horizontally oriented and the cargo supporting crossbar is supported directly above the cargo box area at a location spaced above the plane of the two side portions of the cargo supporting platform; and in the loading position, at least a portion of the cargo frame being more rearward and closer to a ground surface supporting the truck thereon than in the transport position and the cargo supporting crossbar being spaced rearward of the cargo box area, lower in elevation than the transport position.

14. The device according to claim 13 further comprising a winch supported on the cargo supporting crossbar.

15. The device according to claim 13 wherein the pivot arms support the cargo supporting crossbar for pivotal movement about a common pivot axis relative to the cargo frame in two opposing directions from the working orientation to opposed first and second storage conditions respectively, the cargo supporting crossbar being in a common plane with the two side portions spaced forwardly of the common pivot axis in the first storage condition, and the cargo supporting crossbar being in said common plane with the two side portions spaced rearwardly of the common pivot axis in the second storage condition.

16. The device according to claim 13 wherein the cargo supporting platform is open, unobstructed and devoid of any structure between the two side portions along a portion of the cargo supporting platform which protrudes rearward of the cargo supporting crossbar in the transport position.

17. A cargo carrier device in combination with a truck for supporting cargo relative to the truck, the truck having a cargo box area with laterally opposed side walls extending between a passenger cab at a front of the cargo box area and a rear of the cargo box area, the cargo carrier device comprising:

two mounting assemblies mounted solely onto a top side of the two laterally opposed side walls of the cargo box area respectively;

a cargo frame for supporting the cargo thereon;

an operating linkage assembly including a front link assembly and a rear link assembly operatively connected between the cargo frame and the mounting assemblies so as to define a four bar linkage in which:

the front link assembly includes two front link members pivotally coupled between the cargo frame and the mounting assemblies at the laterally opposing sides of the cargo box area respectively; and the rear link assembly includes two rear link members pivotally coupled between the cargo frame and the mounting assemblies at the laterally opposing sides of the cargo box area respectively;

the four bar linkage being adapted to support the cargo frame to be movable relative to the cargo box area between a transport position above the cargo box area and a loading position in which at least a portion of the cargo frame is more rearward and closer to a ground surface supporting the truck thereon than in the transport position; and an actuator operatively connected between the truck and the operating linkage, the actuator being supported fully above the top side of the two side walls respectively throughout movement of the cargo frame between the transport position and the loading position;

wherein the front link members are stepped in profile such that in the transport position each front link member defines a first portion extending forwardly from a pivotal connection to the mounting assemblies, a second portion extending upwardly from the first portion proximate a rear of the passenger cab, and a third portion extending forwardly from the second portion over the passenger cab to a pivotal connection to the cargo frame.

18. The device according to claim 17 further comprising:

the actuator comprising a pair of linear actuators operable between extended and retracted positions, the linear actuators being pivotally coupled at respective first ends of the linear actuators on the mounting assemblies at the top side of the two side walls respectively and being pivotally coupled at respective second ends of the linear actuators on the second portions of the front link members respectively; and the linear actuators being operable to displace the cargo frame towards the loading position as the linear actuators are retracted towards the retracted positions thereof and to displace the cargo frame towards the transport position as the linear actuators are extended towards the extended positions thereof.

* * * * *